United States Patent [19]
Dunks

[11] Patent Number: 6,152,461
[45] Date of Patent: Nov. 28, 2000

[54] RANCH WAGON CONVERTIBLE TO PICNIC TABLE AND BENCHES

[76] Inventor: Larry W. Dunks, P.O. Box 6192, Oroville, Calif. 95966

[21] Appl. No.: 09/144,818

[22] Filed: Aug. 31, 1998

[51] Int. Cl.[7] .................................................. B62B 1/04
[52] U.S. Cl. ..................... 280/30; 280/47.34; 280/651
[58] Field of Search ................ 280/30, 32.5, 47.34, 280/47.35, 47.38, 79.11, 79.2, 108, 639, 651, 657

[56] References Cited

U.S. PATENT DOCUMENTS 2,603,500  7/1952  Messier ...................................... 280/30
5,480,170  1/1996  Kaiser, II .................................. 280/30

*Primary Examiner*—Kevin Hurley
*Assistant Examiner*—Andrew J. Fischer

[57] ABSTRACT

A ranch wagon, which can easily be converted to a picnic table and opposed bench seating. The unit conversion involves removing the side walls, laying them aside, and relocating the front and rear panels from an upward stowed to a lower eating position, and moving the axles from a first inner position to a second outer position. The two side walls are then disposed across the spaced outwardly extended axles. The optional canopy which can include a flap at each end, can be left in place to protect items on the table surface from sun, or removed as is desired.

21 Claims, 7 Drawing Sheets

6,152,461

RANCH WAGON CONVERTIBLE TO PICNIC TABLE AND BENCHES

FIELD OF THE INVENTION

This invention pertains to a decorative object for the yard or driveway which converts to a table and seating.

BACKGROUND OF THE INVENTION

This invention pertains to a convertible ranch wagon which can be turned into a picnic table and bench set.

Many people like the idea of having a picnic table available for use not only as a place for eating out of doors, but also as a place where students of the family and others can sit and work or read as the case may be.

In the west, from the Rocky Mountains to the Pacific Ocean, people enjoy having wagon wheels as well as an entire covered wagon such as a ranch wagon, as a decorative lawn item.

It is an object of this invention to accommodate the desires of people to have a dual function item, by providing a ranch wagon which can be converted for use to a picnic table with benches and then back to a ranch wagon configuration for lawn decoration, all with little or no effort.

It is another object of this invention to provide a decorative ranch wagon which can be used as a play area for children, and which is convertible to a picnic bench and seats.

It is yet another object to provide a picnic table and bench seating that is easy to set up from a decorative ranch wagon.

It is yet another object to provide a covered ranch wagon, which will permit children to play, shielded from the direct sun or rain.

It is a still further object to provide a picnic table and bench seats with a covering there over, to protect the users from sun and rain.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A preferably scaled down version of a preferably canopied ranch wagon, which can easily be converted to a picnic table and opposed bench seating is the basis for this invention. The unit is easy to convert from a decorative object to a functional table and seating, and is easy to convert back to a decorative item again. The first conversion involves removing the side walls and orienting the front and rear walls 180 degrees thereby raising the "wheels", followed by moving the wheels outwardly from a first position to a second position. To return the table and setting to a decorative ranch wagon the steps are reversed.

DESCRIPTION OF THE PREFERRED EMBODIMENT

Figure 1:
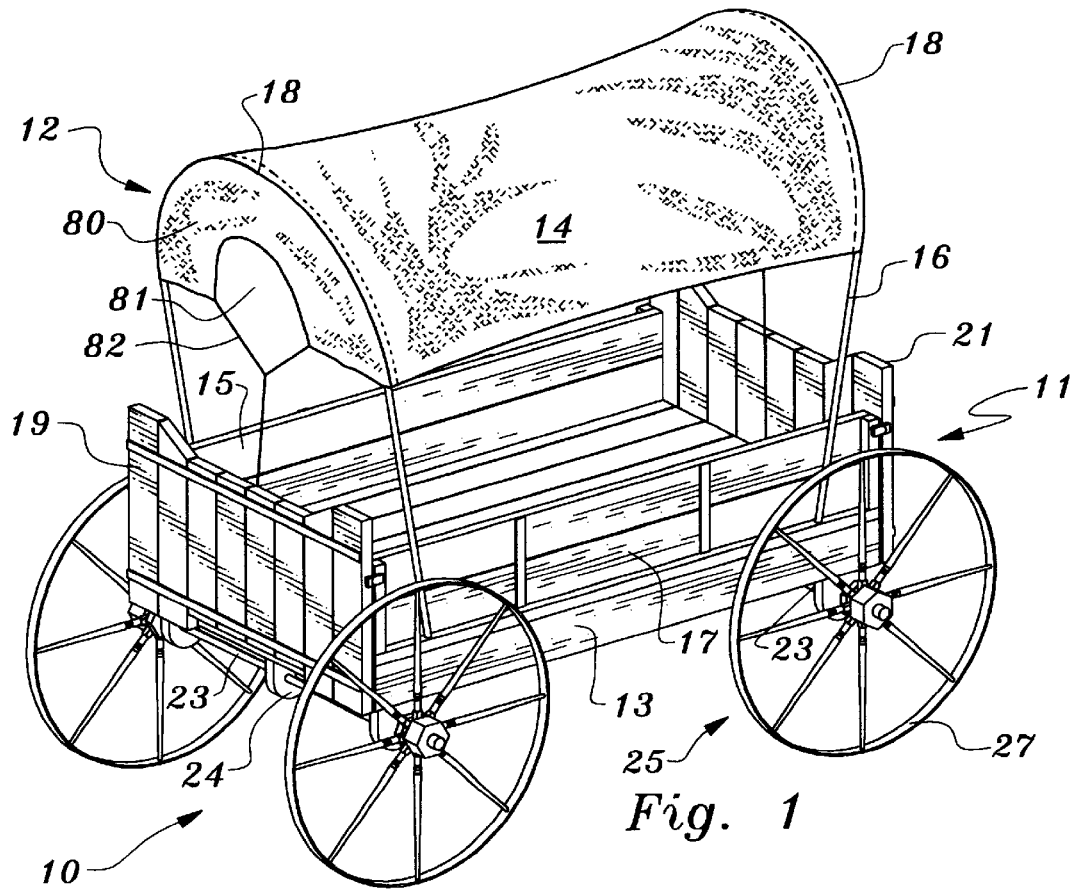
FIG. 1 is a left front perspective view of the ranch wagon to table and seats apparatus of this invention.
Figure 2:
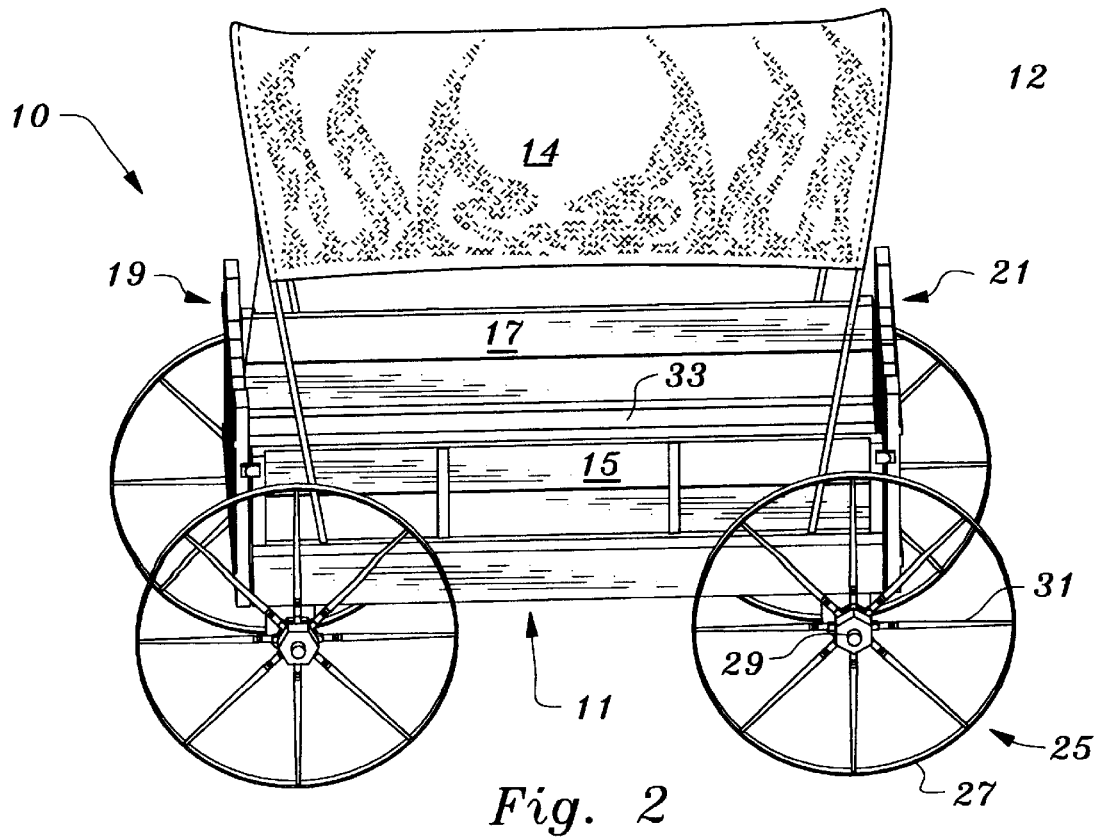
FIG. 2 is a left side perspective view thereof.
Figure 3:
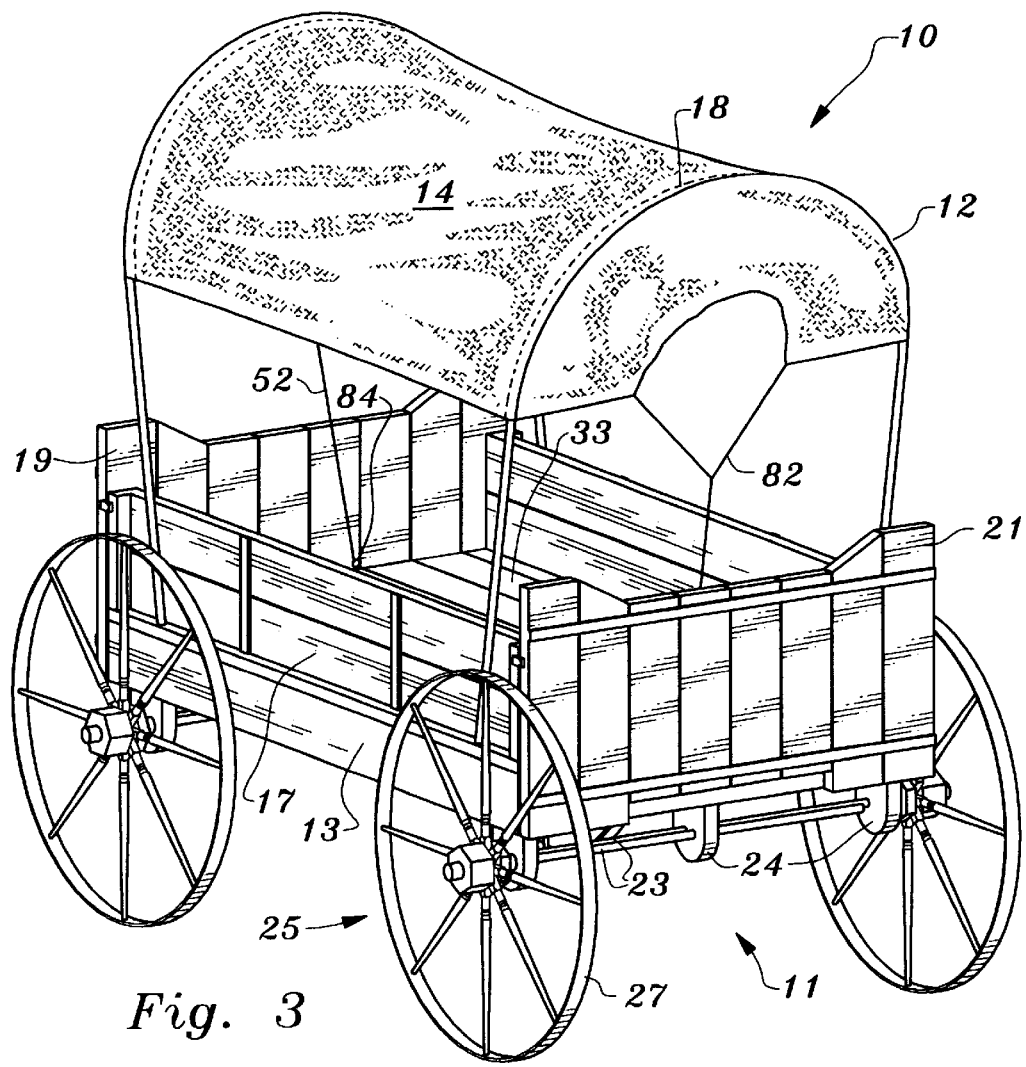
FIG. 3 is a left rear perspective view thereof.

In FIG. 1, the decorative ranch wagon of this invention is seen from the front. This wagon differs from a real such wagon, in that it is scaled down, and does not differentiate between the front and the rear ends of the wagon. That is, there is no special seat provided, adjacent where the hind ends of the team of horses would be. This first view is arbitrarily set as a front left perspective view. A right rear perspective view is seen in FIG. 3. The second figure, FIG. 2 is a left side elevational view, the right side being a mirror image thereof. Details of the wagon are more easily seen in other figures and will be appropriately discussed.

In this view, the decorative item or apparatus 10 is seen. Apparatus 10 includes a wagon portion 11 and a canopy portion 12. The canopy portion 12, and the variant thereof, will be discussed subsequent to the discussion on the wagon portion.

Figure 4:
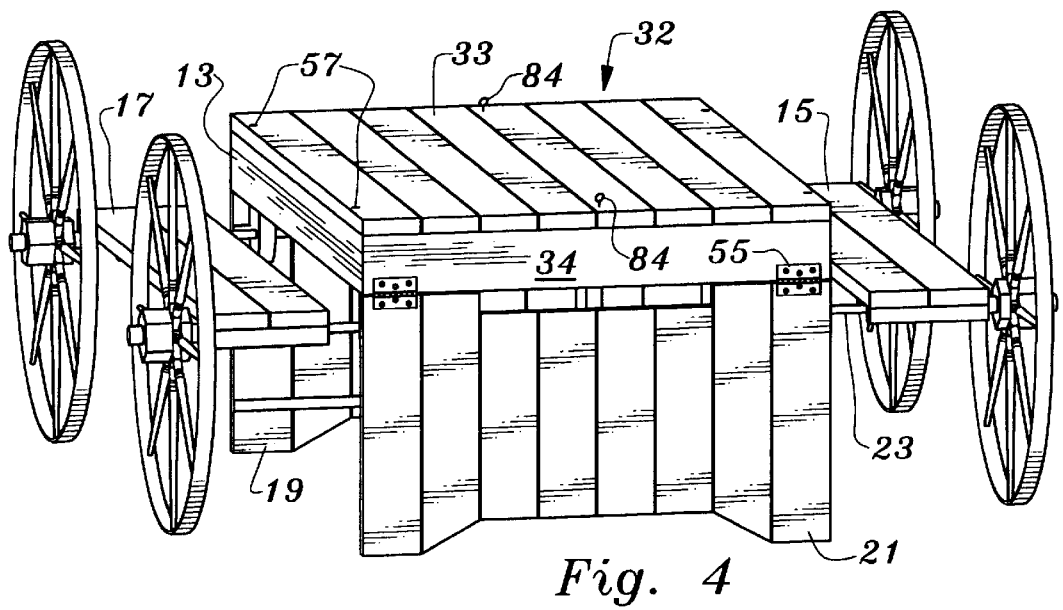
FIG. 4 is a view thereof in the open position with the canopy portion missing.
Figure 5:
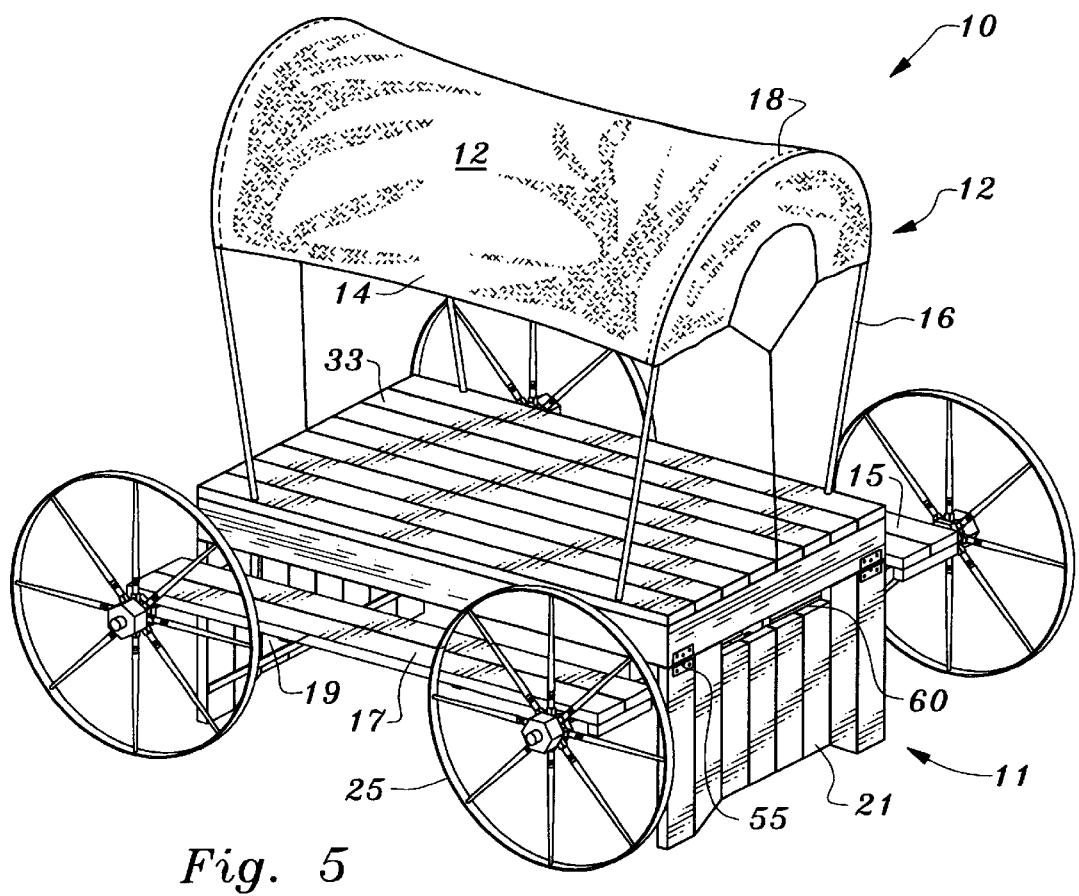
FIG. 5 is a right rear perspective view with the canopy portion in place.

Wagon portion 11 includes a main body 13 of a generally rectangular cross section and is formed from four individual interlocking sections and a table portion to be described more fully below. The main body section include a left side wall, 15, and a right side wall 17 and front and rear panels 19, and 21. All of these are releasably connected to each other at 90 degree intervals as will be recited, and the front and rear panels 19, 21 are pivotally connected, preferably hingedly connected, to the table portion, 32. The four sections rest on a table surface of the table portion 32. Thus the table portion includes a table surface 33 which table surface is supported by right and left table sides 39, 41 per FIGS. 6 and 7 and spaced opposed end sills 34 seen in FIGS. 4, 9 and 10.

Figure 13:
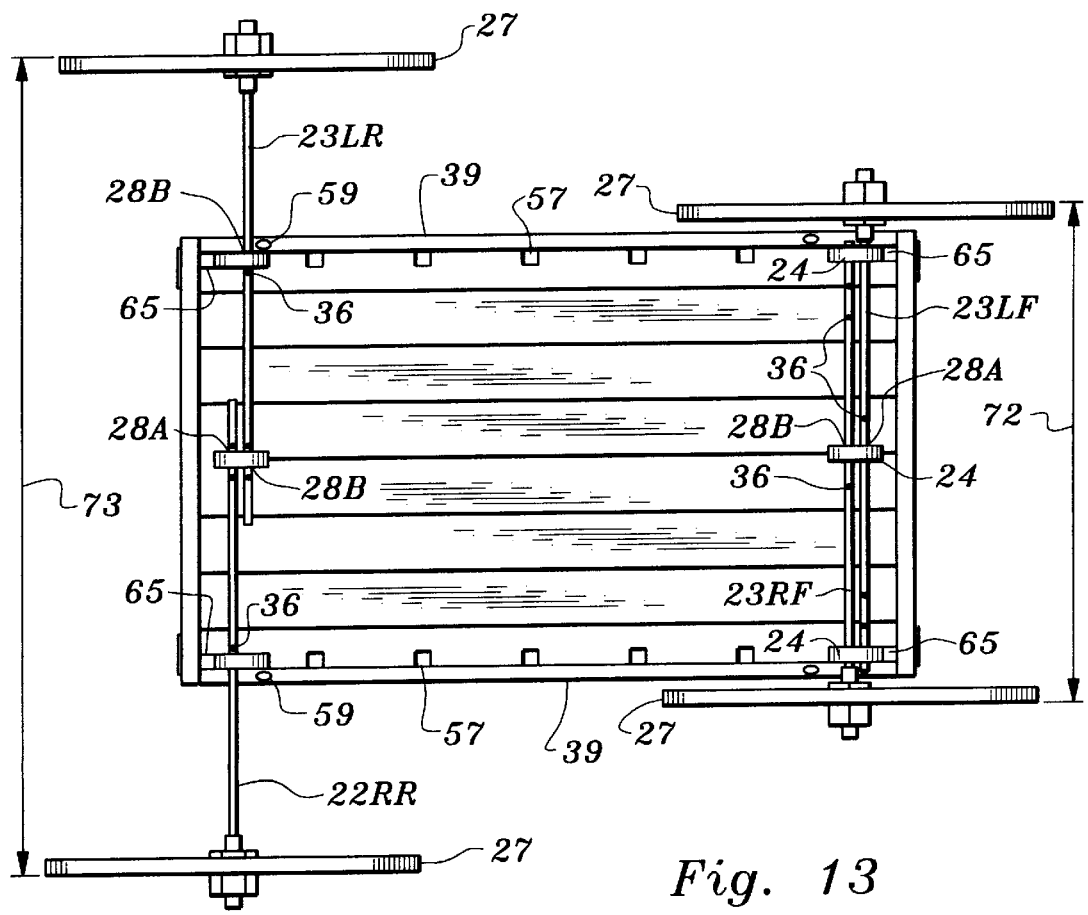
FIG. 13 is a bottom plan view of the device of this invention.

Disposed beneath the table surface 33 are two trios of spaced and aligned axle holders 24. Again reference is made to FIGS. 6, 7 and 13. These axle holders are aligned with the left side and right side walls of the apparatus such that the axles can pass through them in a disposition normal to the end panels as is seen in FIG. 13. The axle holders are also spaced in an equal distance from the front and rear end panels.

Figure 7:
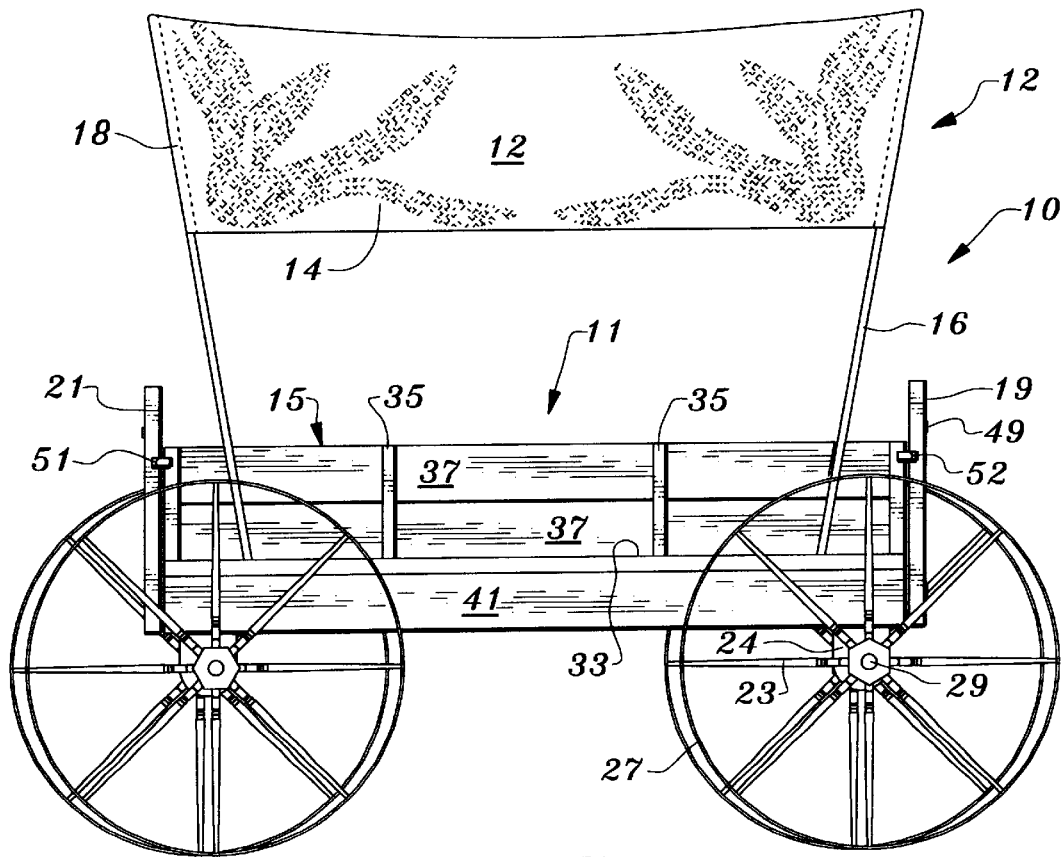
FIG. 7 is a left side diagrammatic elevational view of this invention with the canopy.

Each wheel 25 is formed of several components. As seen in FIG. 2, each wheel 25 has a hub 29 from which emanates a plurality of spokes, 31,—here 8 spokes disposed 12.5 degrees apart. Each spoke 31, extends an equal distance to a felloe or rim 27. While no tread or overlay is depicted on the felloe, the use of such is contemplated. Each hub receives the end of an axle 23, which axle is retained by one or more conventional pins, not seen. Reference is made to FIG. 7. Further discussion infra concerning the axles employed with this invention. The attachment of axles to hubs of wagons is deemed conventional in this day and age. If the felloe contained a tread, as it could, it would be termed a "wheel".

Figure 6:
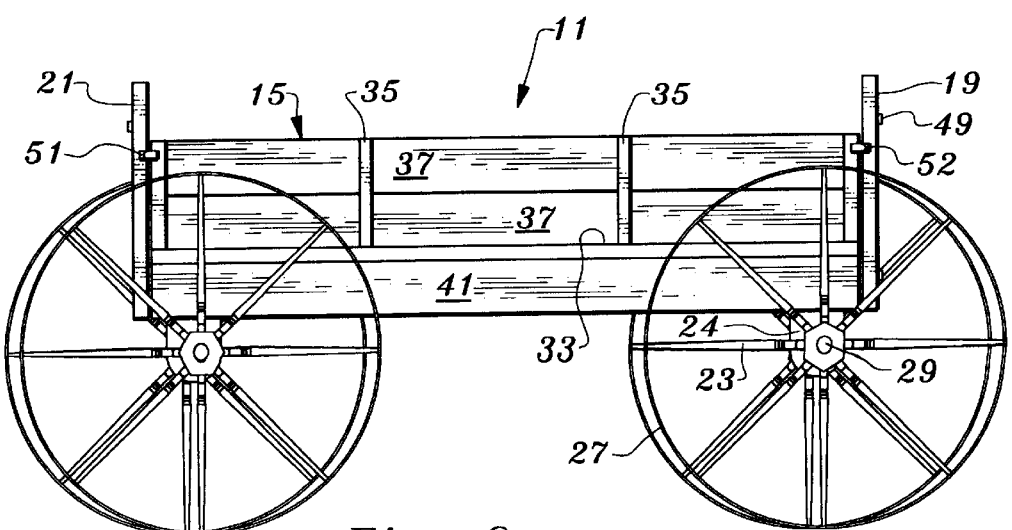
FIG. 6 is a left side diagrammatic elevational view of this invention without the canopy.

The discussion now turns to FIG. 6 for a more detailed dissertation about the side walls and the front and rear panels. Thus each side wall 15, 17 is seen to be formed from a plurality of butt-edged boards, such as 2×6 boards, which abut along their length. This plurality is held together by a series of spaced cleats, 35 disposed normal to the abutted boards 37. Preferably the cleats are mounted externally of the space 60 found between the side walls and the end panels, i.e., the area of the table surface 33. The side wall 17 of FIG. 7 is constructed in the exact same manner as side wall 15 found in FIG. 6, and consists of abutted boards or planks 37 and a plurality of cleats 35, all of which terminate vertically prior to table side 39.

Each of the two side walls, 15, 17 includes the hasp portion 51 of a chest latch 50. The strike portion is mounted on the end grain of the respective front and rear panels. These chest latches secure the end panels to the side walls.

Figure 12:
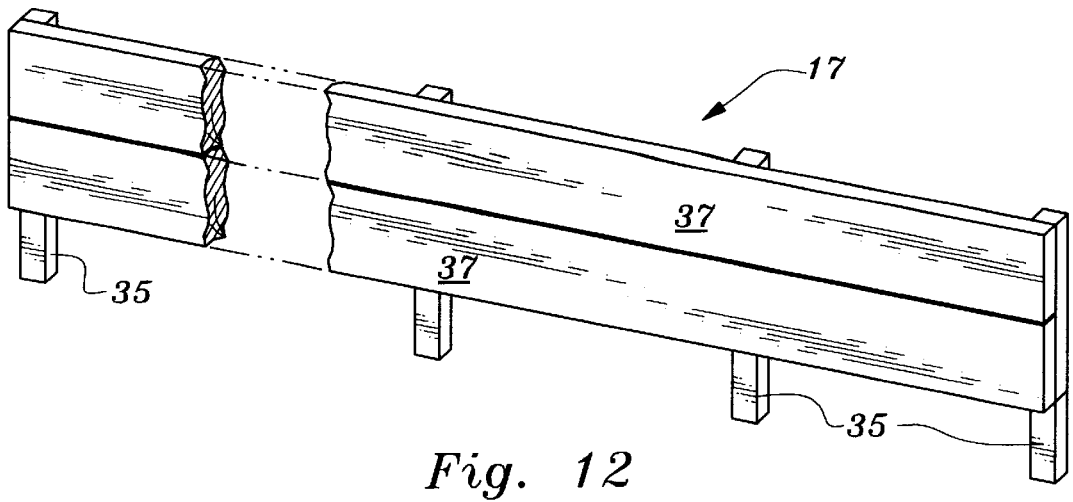
FIG. 12 is a perspective view of a right side wall and the cleats attached thereto for mounting.

FIGS. 2 and 7 depict what is seen of the side walls 15, 17 external of the wagon per se. In FIG. 12, side wall 17's vertically disposed spaced cleats 35 are seen. These cleats, usually range from 6 to 12 inches in elevation, are screwed to the panel, and serve to retain the generally vertical side walls upon the table surface 33, by being inserted into spaced cleat slots 57 (per FIG. 13) in the table surface 33 of table 32.

Figure 8:
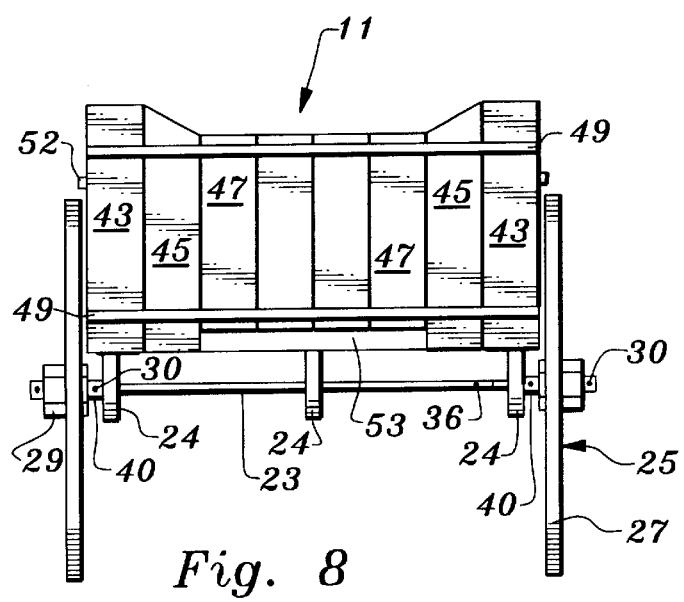
FIG. 8 is a rear elevational diagrammatic view of the apparatus in this invention in the closed position.

Reference is now made to FIG. 8, a view of the rear end panel when the panel is in the upward position. The rear panel 21, and its mirror image companion front panel 19, not seen, are each formed from a plurality of abutted varying sized planks which are joined together by attaching each, as by nailing or screwing to a pair or more of spaced straps 49. Typically the straps are flat metal strips, perhaps ¼ inch thick and predrilled for the passage of nails therethrough. Other materials may be used however. While shown attached to the exterior surface of the planks as seen in the first position, no reason is seen why the straps could not be attached either on the first position interior surface of these planks or on both sides of the planks. Such straps are readily available in the marketplace.

Each of the panels 19, 21 when in the decorative or first position, have each of their individual planks lower extremity aligned horizontally. The elevation of each of the outer planks 43, is the greatest. The next inner plank, 45, from both the left and right sides of the panel is preferably of a lesser elevation. These planks 45 may be made shorter than the plank 43 by using a straight cut or they may be made tapered as shown in the figure.

The middle planks 45 are also preferably of an even lesser elevation for several reasons. First, the aesthetics of the panel will more closely resemble historic wagons if so constructed. And second, by having the inner planks of shorter elevation, when the panel is inverted and in its second or eating position, as will be seen in FIG. 9, persons sitting at the end of the table will not kick the respective end panel and it will be easier for the owner to grasp the panel for return to the first position, 180 degrees opposed.

Figure 9:
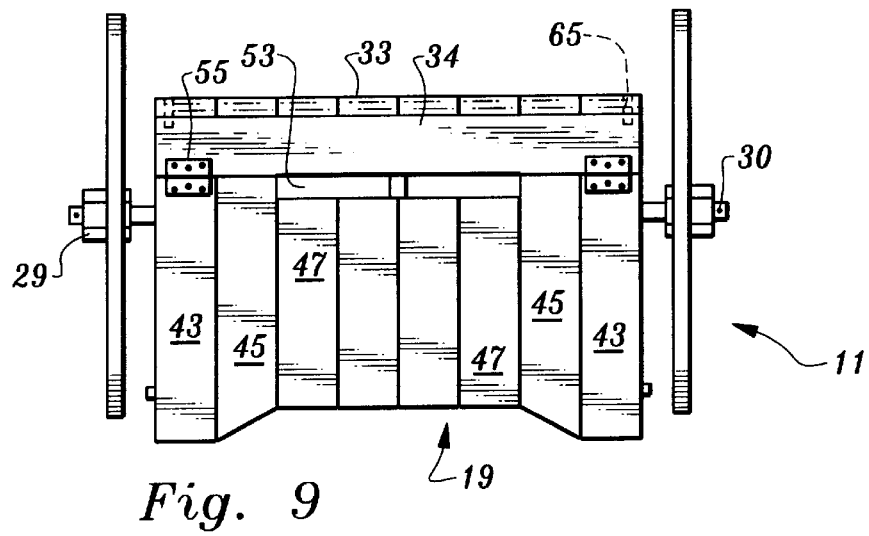
FIG. 9 is a diagrammatic rear view with the table in open position.

Preferably as seen in FIGS. 8 and 9, the interior planks 45 are disposed spaced up from the lower extremity of the outer planks 43 and from the next inner planks 45. The cross slot 53 is used also as a hand grasp for turning the respective end panels 19, 21 from decorative position to the eating position. The cross slot 53 is preferably about 2 to 3 inches in elevation. Boards sized 2×6 inches may be utilized for all of the planks. Note also the presence of the chest latch strike 52 on the end grain of the panels for the reason previously mentioned. In this view the table 32's surface 33 and its supports are not recognized. This is because if one inserts his/her fingers into slot 53, the fingers will impact the table 32 on the end grain.

Figure 11:
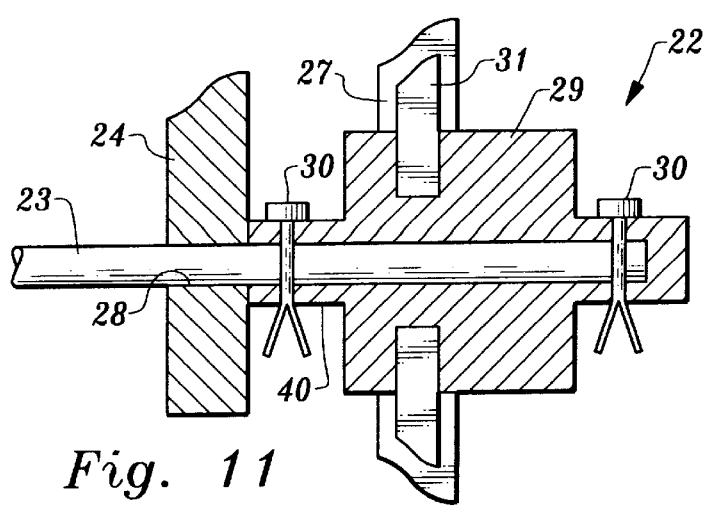
FIG. 11 is a partial diagrammatic view of a wheel assembly 22 and the parts forming same.

The trio of axle holders 24, linearly spaced apart are seen to be mounted to the underside of the table 32. Each axle holder has a throughbore 28 for receipt of an axle 23. Each axle terminates within a hub 29 and extends slightly beyond the hub as is conventional. Each hub is retained in place by a cross pin 30 that fits through each hub retainer 40 attached to the rear of each hub, and which pin 30 passes through both the hub retainer 40 and the axle 23. See FIG. 11. Any other conventional retaining means can also be employed as these wheels 25, while about 2 inches thick for stability, are not meant to rotate.

The construction of each of the end panels is the same as these elements 19 and 21, are basically mirror image panels.

Figure 10:
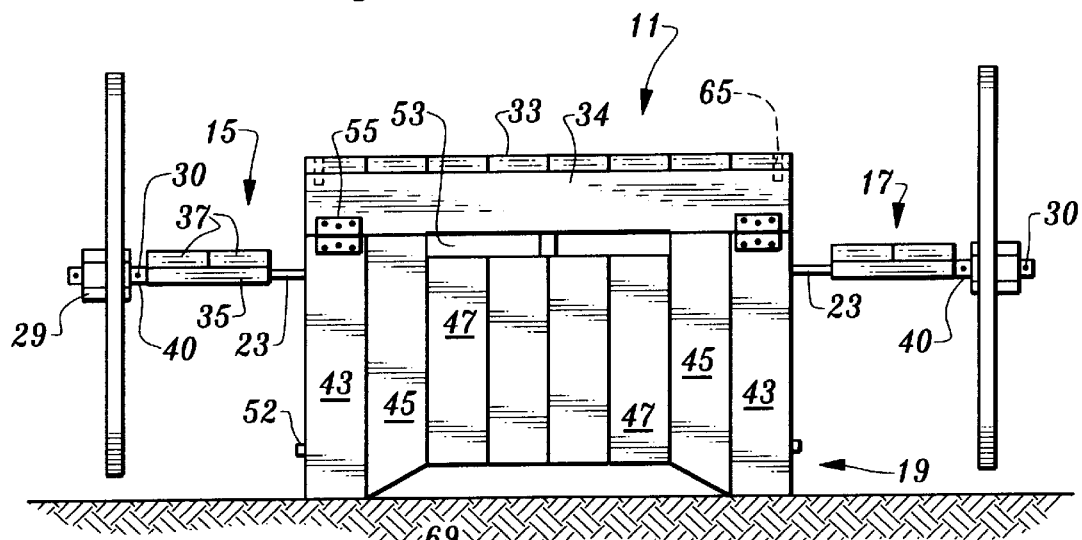
FIG. 10 is a diagrammatic end view taken moments subsequent to FIG. 8 with the seats in position.

In FIG. 9, the end panel 19 is shown in the down or eating position. A pair of horizontally spaced door hinges 55 connect the end panel 19 to the end sill 34, which sill is typically a 2×6-inch board such that the end panel can pivot from a stowed upward to a lowered downward position. The hinges or other pivoting member are attached to the respective end panel at a location such that when the end panels are moved to the down position, the elevation of each such end panel as measured from the pivot point, i.e., the hinges to the ground, is greater than the distance of the axle to the ground, such that the "wheels"—actually felloes without treads, will rise off the ground. This positioning makes it easier to move the axles outwardly away from the wagon body 13, to the seating position as depicted in FIG. 10 as is seen in this figure, the two "wheels" become spaced up from the ground 69.

FIG. 13 is a bottom plan view of the wagon portion 11 of this invention. This view depicts the moveability of the two axles to move the axles from the inner or wagon position as seen in FIG. 8 to the eating or outer position seen in FIG. 10. While the axles have generally been denoted as 23, for the sake of full clarity, each of the 4 axles has been designated by its location. Thus, in FIG. 13, the four axles have been designated as 23LF for left front, 23RF for right front, 23LR for left rear and 23RR for the right rear axle. Unlike FIGS. 8 and 10, the bottom plan view shows all 6 of the axles holders 24, each of which has a pair of side by side bores 28 therethrough designated 28A and 28B, with the "A" designated holes being the exterior positioned bores and the "B" designated bores being the interior positioned bores. These 3 sets of 2 bores are aligned in such a manner that the axles when in the inner or stowed position can pass through 3 of the designated pairs of aligned bores 28.

Each axle has a pin strategically inserted normal to the length of the axle, along the length of the axle at a location 72 which is somewhat critical in that the placement is chosen for pin 36 such that the axles can be moved from a stowed position 72, passed through 3 axle holders as per the right part of the FIG. 13 drawing and FIG. 8; to a deployed position, 73, per the left part of the view being retained by 2 such axle holders. Thus the lateral movement is from the respective arrowed line positions, which match the positioning of the front axles, 72, to the extended location as shown in FIG. 10 and position 73.

A typical pin may be a heavy duty, #14 size, headed wood screw not fully inserted into the axle, such that the axle cannot pass through the center axle holder when the axle is pulled out, and can pass through the opposite side axle holder, when the axle is stowed. See also FIGS. 8 and 10. Alternatively a cotter pin may be used for pin 36 as well as for cross pin 30 which holds the hub retainer in place.

As seen in FIGS. 1, 2, and others the side walls 15, 17 are shown disposed in place in the table surface 33. When these are removed, the side walls serve as the seating for users of the apparatus 10 who desire to eat. One of the two side walls 17 is shown in FIG. 12. Side walls 15, 17 are each formed from a pair of 2×6 planks, designated 37 to which a plurality of cleats 35 have been attached at 90 degrees on the rear side thereof. Each cleat is of a greater elevation than the pair of abutted planks such that the lower portion of the cleat can be inserted into cleat slots 57, which penetrate table surface 33 and are seen in the bottom plan view FIG. 13. Notice the presence of table sides 39, seen from their underside in FIG. 12, as well as in FIG. 7.

In FIG. 1, the standard canopy portion 12 is seen disposed on the wagon portion 11. The canopy portion is best seen in FIGS. 1, 2, 5 and 7. Canopy portion 12 comprises a flexible fabric generally rectangular section 14 having rolled tubular seams 18 on the forward and rear edges. These rolled seams 18 serve as support receivers, for flexible bendable rods 16—per FIG. 7, which are fed therethrough, and extend beneath each of the support receivers 18, for insertion into support mounts, 65, which are slots at each of the four corners of the table surface 33. These slots are similar to the cleat slots 57 also seen in FIG. 13.

Attached to each rolled seam is an end portion preferably configured as a horseshoe and having a semicircular cutout therein as per FIG. 1. A Y-shaped tie string 82 (optional) may be retained in the air or optionally tied to an eyelet 84 at the respective end of table surface 33. See FIGS. 3 and 4.

Figure 14:
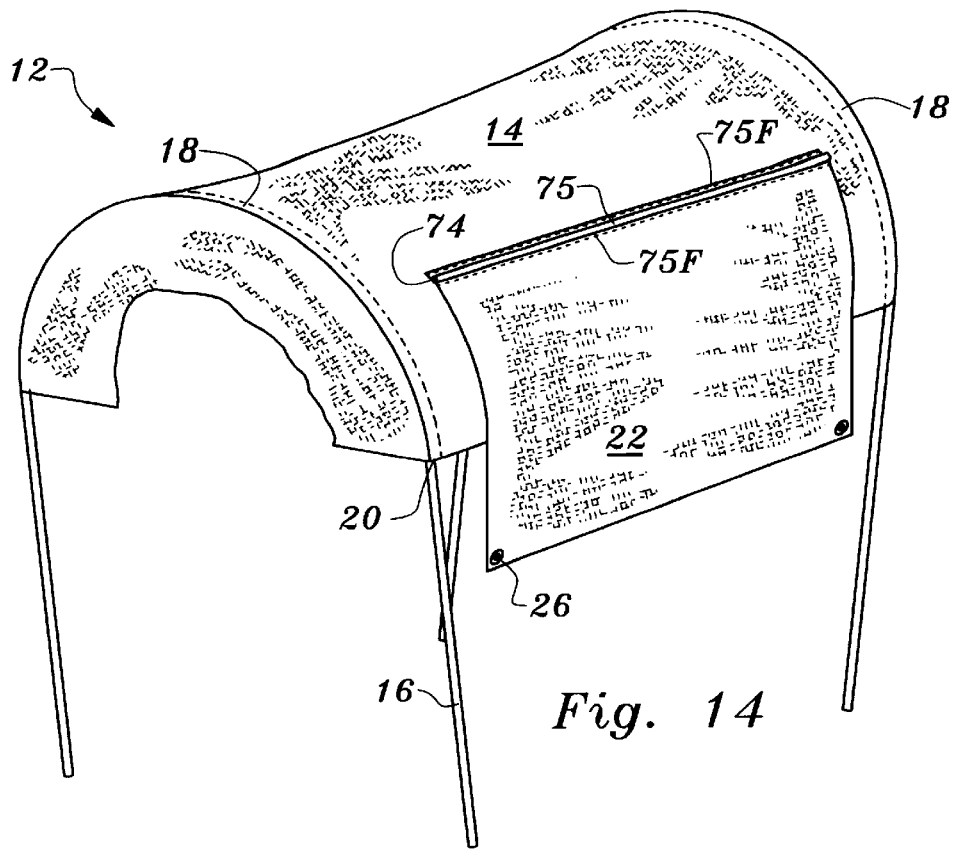
FIG. 14 is a perspective view illustrating a variant of the canopy portion of this invention.
Figure 15:
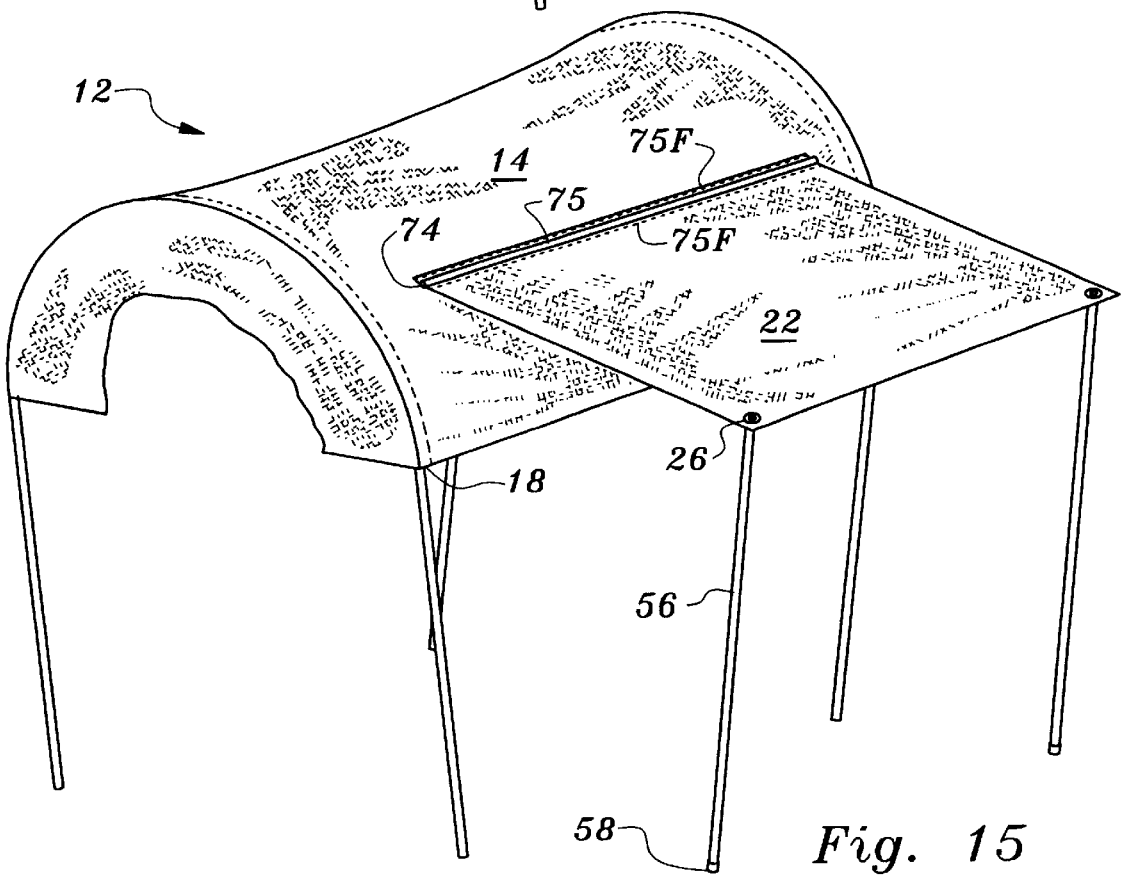
FIG. 15 is a view similar to FIG. 13 taken a few moments later in time with the canopy portion in a raised position.

As seen in FIGS. 14 and 15, each canopy portion 12 may also include an optional flap 22 which can be raised to serve as a sun or rain shield for persons dining at the table surface 33. In FIG. 14, such flap 22 is shown in its downward position. The flap 22 is secured to a tubular rod receiver 75 which has a pair of opposed flaps 75F, attached thereto, one of which flaps is sewn to the fabric 14 and other of which flaps 75F is sewn to the flap 22. A rod 74 is disposed within the rod receiver to aid in the pivoting open and closed of the flap and to lend shape credence. Each flap 22 also includes a nipple shaped pole holder 26 disposed at each lower corner. This can be a small plastic member 1-inch long such as schedule 40 PVC. The pole holder 26 may be glued, sewn or otherwise retained, in the corners of the canopy fabric 14. A preferably telescopic pole 56 having an end 58 which may be a rubber boot or a spike as may be desired, at its distal end has its proximal end inserted into the pole holder 26, per FIG. 15. Two sets of two pole clips 59 can be mounted to the underside of the table surface 33 to retain the four poles 56 when not employed. See FIG. 13.

While not shown the optional tie 82 could also be employed in this variant of the canopy.

It is seen that I have created a unique convertible wagon which can be changed from a decorative apparatus to a useable eating table by carrying out a series of steps. These steps include, the removal of the side walls, 15, 17, the orientation of the end walls from a stowed up to a usable down position. The lowering of the front and rear panels, automatically raises the apparatus off of the wheels such that the weight is born by the front and rear panels. The result is that the wheels will be raised a few inches off of the ground. (This is the same effect that arises upon using a jack to change a tire.) This enables the axles having the wheels thereon to be moved outwardly such that the previously removed side walls can be placed across the now extended axles to provide seating at the table surface 33. The cleats serve as lateral movement inhibitors for the thus located side walls.

The apparatus of this invention can be made any size to accommodate strictly children or full-size adults. The materials mentioned, mostly 2×6 inch boards will easily accommodate the weight of several adult males along the length thereof.

In case of rain or sun, the optional flaps can be raised to provide shade or relief from the rain as may be desired at any point in time. The raising constitutes the removal of the poles from their clip mounting on the under side of the table surface, and the insertion of the poles, which are made of a cross section just slightly less than that of the pole holders, into the pole holders of the flaps. In case of a wind the drawn string a tree string 82 can be secured to its eyelet 84.

Since certain changes may be made in the above described apparatus without departing from the scope of the invention herein involved, it is intended that all matter contained in the above description and in the accompanying drawings, if present, shall be interpreted as illustrative only and not in a limiting sense.

I claim:

1. A ranch wagon, which can easily be converted to a picnic table and opposed bench seating which comprises:
   a wagon portion which includes a main body of a generally
      rectangular cross section and is formed from four individual interlocking sections, and a table portion,
   said main body sections including a left side wall, a right side wall, and front and rear panels; all of which are releasably connected to each other at 90 degree intervals, and which are carried by the table portion, and the front and rear panels are also pivotally connected to the table portion;
   said table portion includes a table surface which table surface is supported by right and left table sides and two spaced opposed end sills;
   said table portion further including two trios of spaced and aligned front and rear axle holders disposed beneath the table surface; one of each trio of axle holders being a left, a central and a right axle holder; and
   wheel carrying front and rear axles disposed in said respective axle holders, and movable from a first position adjacent the table portion to a second portion distant from the table portion;
   whereby when said wheel carrying axles are in said second
      position, the releaseably connected side walls when disconnected from the front and rear panels and laid across the front and rear axle thereby form bench seating spaced from said table portion.

2. The ranch wagon of claim 1 wherein the rear panels are hingedly mounted to the table portion.

3. The ranch wagon of claim 1 wherein each side wall is formed from a plurality of abutting boards, held together by a series of spaced cleats.

4. The ranch wagon of claim 1 wherein the front and rear panels are formed from a plurality of abutted planks joined together by at least a pair of spaced straps.

5. The ranch wagon of claim 3 wherein the front and rear panels are formed from a plurality of abutted planks joined together by at least a pair of spaced straps.

6. The ranch wagon of claim 1 wherein the front and rear panels are formed from plurality of vertically abutted planks, with the outer planks on each end being longer than the balance of the planks.

7. The ranch wagon of claim 1 wherein there are four wheel carrying axles, each designated by location; namely, left front, right front, left rear, and right rear, each carrying one wheel; and each of said axle holders has a pair of throughbores, each pair of bores of each member of both trios being aligned with the throughbores of the other axle holders of its respective trio; and wherein each axle is inserted into an aligned bore of all members of a trio of axle holders, when in the first position which is the stowed position; and each axle is inserted into two aligned bores, one in each of two axles when in the second position which is the extended position.

8. The ranch wagon of claim 3 wherein the table portion includes a plurality of cleat slots adapted to receive the cleats of said side walls.

9. The ranch wagon of claim 1 further including a canopy portion.

10. The ranch wagon of claim 9 wherein the table portion includes support mounts for the canopy portion, and the canopy portion comprises a flexible fabric section having a pair of spaced rolled tubular seams, through each of which seams is disposed a flexible rod, one end of which is disposed within one of the support mounts of said table portion.

11. The ranch wagon of claim 10 wherein the canopy portion further includes a flap fore and aft of the flexible fabric section.

12. The ranch wagon of claim 11 wherein each flap of the canopy is horseshoe shaped and includes a tie thereon.

13. A ranch wagon, which can easily be converted to a picnic table and opposed bench seating which comprises:

a wagon portion which includes a main body of a generally rectangular cross section and is formed from four individual interlocking sections, and a table portion, said main body sections including a left side wall, a right side wall, and front and rear panels; all of which are releasably connected to each other at 90 degree intervals, and which are carried by the table portion, and the front and rear panels are also hingedly connected to the table portion;

wherein each side wall is formed from a plurality of abutting boards, held together by a series of spaced cleats, and wherein the front and rear panels are formed from a plurality of abutted planks joined together by at least a pair of spaced straps;

said table portion includes a table surface which table surface is supported by right and left table sides and two spaced opposed end sills;

said table portion further including two trios of spaced and aligned front and rear axle holders disposed beneath the table surface; one of each trio of axle holders being a left, a central and a right axle holder; and wheel carrying front and rear axles disposed in said respective axle holders, and moveable from a first position adjacent the table portion to a second portion distant from the table portion;

whereby when said wheel carrying axles are in said second position, the the releaseably connected side walls when disconnected from the front and rear panels and laid across the front and rear axle thereby form bench seating spaced from said table portion.

14. In the ranch wagon of claim 1, wherein the pivot point of each end panel is set such that the elevation of each end panel as measured from the pivot point, to the ground, is greater than the distance of the axle to the ground, whereby the wheels carried by the axles will rise off the ground when the end panels are pivoted to the ground to make extension thereof easier.

15. The ranch wagon of claim 13 wherein the front and rear panels, have their outer planks on each end being longer the balance of the planks.

16. The ranch wagon of claim 15 wherein there are four wheel carrying axles, each designated by location; namely, left front, right front, left rear, and right rear, each carrying one wheel; and each of said axle holders has a pair of throughbores, each pair of bores of each member of both trios being aligned with the throughbores of the other axle holders of its respective trio; and wherein each axle is inserted into an aligned bore of all members of a trio of axle holders, when in the stowed position; and each axle is inserted into two aligned bores, one in each of two axles when in the extended position.

17. The ranch wagon of claim 13 wherein the table portion includes a plurality of cleat slots adapted to receive the cleats of said side walls and said wagon further includes a canopy portion.

18. The ranch wagon of claim 13 wherein each wheel carrying axle comprises a wagon wheel disposed on said axle and retained by a hub.

19. The ranch wagon of claim 17 wherein the table portion includes support mounts for the canopy portion, and the canopy portion comprises a flexible fabric section having a pair of spaced rolled tubular seams, through each of which seams is disposed a flexible rod, one end of which is disposed within one of the support mounts of said table portion.

20. The ranch wagon of claim 19 wherein the canopy portion further includes a flap fore and aft of the flexible fabric section.

21. The ranch wagon of claim 15, wherein the pivot point of each end panel is set such that the elevation of each end panel as measured from the pivot point, to the ground, is greater than the distance of the axle to the ground, whereby the wheels carried by the axles will rise off the ground when the end panels are pivoted to the ground to make extension thereof easier.

* * * * *